United States Patent [19]

Ramanarayanan

[11] Patent Number: 4,763,729

[45] Date of Patent: Aug. 16, 1988

[54] METHOD FOR INHIBITING CORROSION OF IRON-CONTAINING ALLOY ARTICLES IN SULFUR-CONTAINING MEDIA

[75] Inventor: Trikur A. Ramanarayanan, Somerset, N.J.

[73] Assignee: Exxon Research and Engineering Company, Florham Park, N.J.

[21] Appl. No.: 48,562

[22] Filed: May 11, 1987

[51] Int. Cl.⁴ .............................................. E21B 41/02
[52] U.S. Cl. ................................. 166/244.1; 166/902; 252/8.555
[58] Field of Search ..................... 166/902; 252/8.555, 252/244.1

[56] References Cited

U.S. PATENT DOCUMENTS 3,928,211 12/1975 Browning .......................... 252/8.55

Primary Examiner—Sam Silverberg

[57] ABSTRACT

Corrosion of iron-containing alloy articles is inhibited by forming on the articles a corrosion resistant layer containing atoms of a refractory metal.

15 Claims, 2 Drawing Sheets

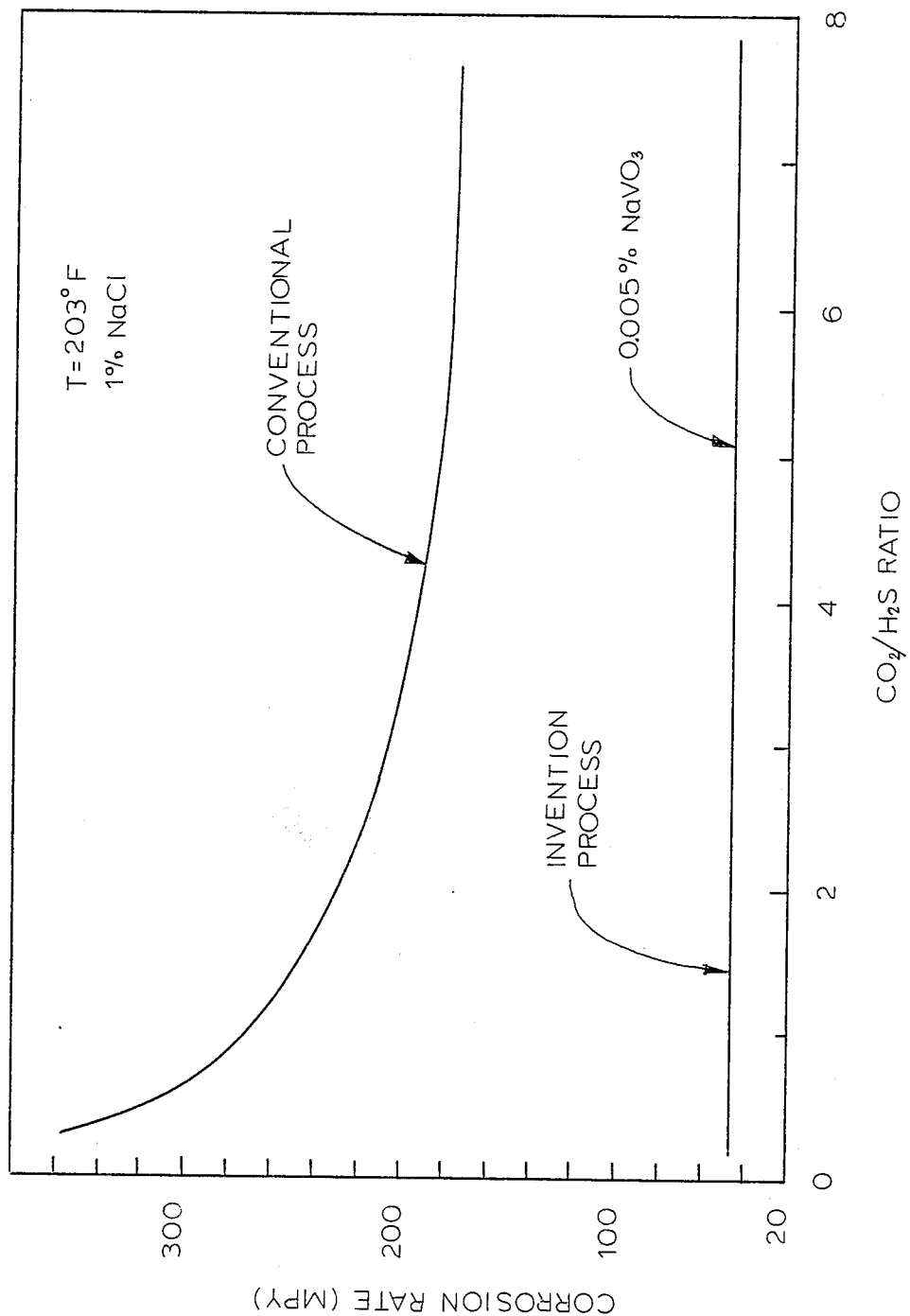

METHOD FOR INHIBITING CORROSION OF IRON-CONTAINING ALLOY ARTICLES IN SULFUR-CONTAINING MEDIA

BACKGROUND OF THE INVENTION

1. Field of the Invention

This invention relates to a method for inhibiting corrosion of iron-containing alloy articles, particularly tubular articles of, for example, carbon steel, in a sulfur-containing corrosive media, such as hydrogen sulfide.

2. Description of the Prior Art

In various applications, and particularly in deep gas and oil-well production and drilling applications, there is a need for material that is corrosion resistant, and particularly resistant to corrosion caused by sulfur-compound containing environments, such as those containing hydrogen sulfide. In deep-well production and drilling applications, commonly termed sour well applications, the drilling components, and particularly the tubing extending into the well, are subject to environments containing various levels of hydrogen sulfide, often in combination with carbon dioxide, brine, and various hydrocarbons. Tubing used for this purpose is for reasons of economy made from carbon steel. In the presence of hydrogen sulfide encountered in sour well applications, corrosion of the carbon steel occurs as a result of the iron reacting to form iron-sulfide phases, particularly on the inner wall surfaces of the tubing extending into the well and subjected to the sulfide environment.

More particularly, in sour gas environments, the iron-containing alloy, e.g. carbon steel, undergoes attack by sulfur-containing compounds such as hydrogen sulfide, resulting in the formation of a scale of various ferrous sulfide phases such as pyrite and marcasite ($FeS_2$); pyrrhotite ($Fe_{1-x}S$); and mackinawite, ($Fe_{1+x}S$). In accordance with the present invention, it has been found that ferrous ions are rapidly transported through such sulfide phases, in particular the pyrrhotite phase, and react with the sulfur containing compound at the outer surface leading to the corrosion process.

More highly corrosion resistant materials add, if substituted for carbon steel, significantly to the overall cost of the extraction operation.

SUMMARY OF THE INVENTION

It is accordingly a primary object of the present invention to provide a method for inhibiting the corrosion of iron-containing alloy articles subjected to a sulfur compound-containing medium; such medium can additionally contain other corrosive species such as carbon dioxide, brine and various hydrocarbons.

A more particular object of the invention is to provide a method for inhibiting the corrosion of iron-containing alloy articles in a sulfur-containing media by providing in situ a corrosion inhibiting film or layer.

Additional objects and advantages of the present invention will be set forth in part in the description that follows and in part will be obvious from the description or may be learned by practice of the invention. The objects and advantages of the invention may be realized and obtained by the method particularly pointed out in the appended claims.

Broadly, in accordance with the invention, a method is provided for inhibiting the corrosion of an iron-containing alloy article, which may be steel and preferably carbon steel, that is in a sulfur compound-containing corrosive medium. In accordance with the method of the invention, the chemistry of the ferrous sulfide scale is modified in order to suppress and minimize ferrous ion transport therethrough and, therefore, to control corrosion. It has been found that the incorporation of certain metals which are heavier than iron and which have greater affinity for sulfur than iron into the iron sulfide scale or layer can lead to the retardation of ferrous ion transport through the iron sulfide scale. It is to be understood that the sulfide scale may additionally contain other compounds including nonmetallic compounds, such as oxides and oxysulfides. It has been shown that refractory metals of Group IVB and Group VB of the periodic system are particularly effective in this regard. In practicing the invention, a salt of Group IVB or Group VB metal, which is termed an oxysalt, is added to the corrosive medium, whereby said metal is incorporated into the iron sulfide scale and in turn affects its growth rate. The suppression of the growth rate of the iron sulfide phases leads to a reduction in the overall corrosion to acceptably low levels.

The metal salt is suitably an inorganic oxysalt of the Group IVB or Group VB metal and is used in an amount sufficient to effectively reduce corrosion. The salt may be included in amounts from 0.001 to 0.01% in solution in the corrosive medium. Particularly effective salts are the meta-, ortho- and pyrovanadates ($NaVO_3$, $Na_3VO_4$ and $Na_4V_2O_7$, respectively).

With the method of the invention the iron-containing tubular article is situated in a well and oil or gas is extracted from the well through the tubular article in the well known manner. Incident to this extraction, the interior portion of the article is in contact with a sulfur compound-containing corrosive medium which typically contains hydrogen sulfide. The metal salt is, for example, introduced into reactive contact with the interior surfaces of the alloy article and the corrosive medium to produce the corrosion resistant layer or film on the interior portion of the tubular article. The corrosion resistant layer is formed in situ, therefore, on the interior portion, including the interior surface, of the tubular article.

The accompanying drawings, which are incorporated in and constitute a part of this specification, illustrate embodiments of the invention and, together with the description, serve to explain the principles and advantages of the invention.

BRIEF DESCRIPTION OF THE DRAWINGS

FIG. 2 is a curve showing the initial effect of the use of a metavanadate in accordance with the method of the invention on the corrosion rate of carbon steel at various carbon dioxide/hydrogen sulfide ratios.

DETAILED DESCRIPTION OF THE PREFERRED EMBODIMENTS

Figure 1:
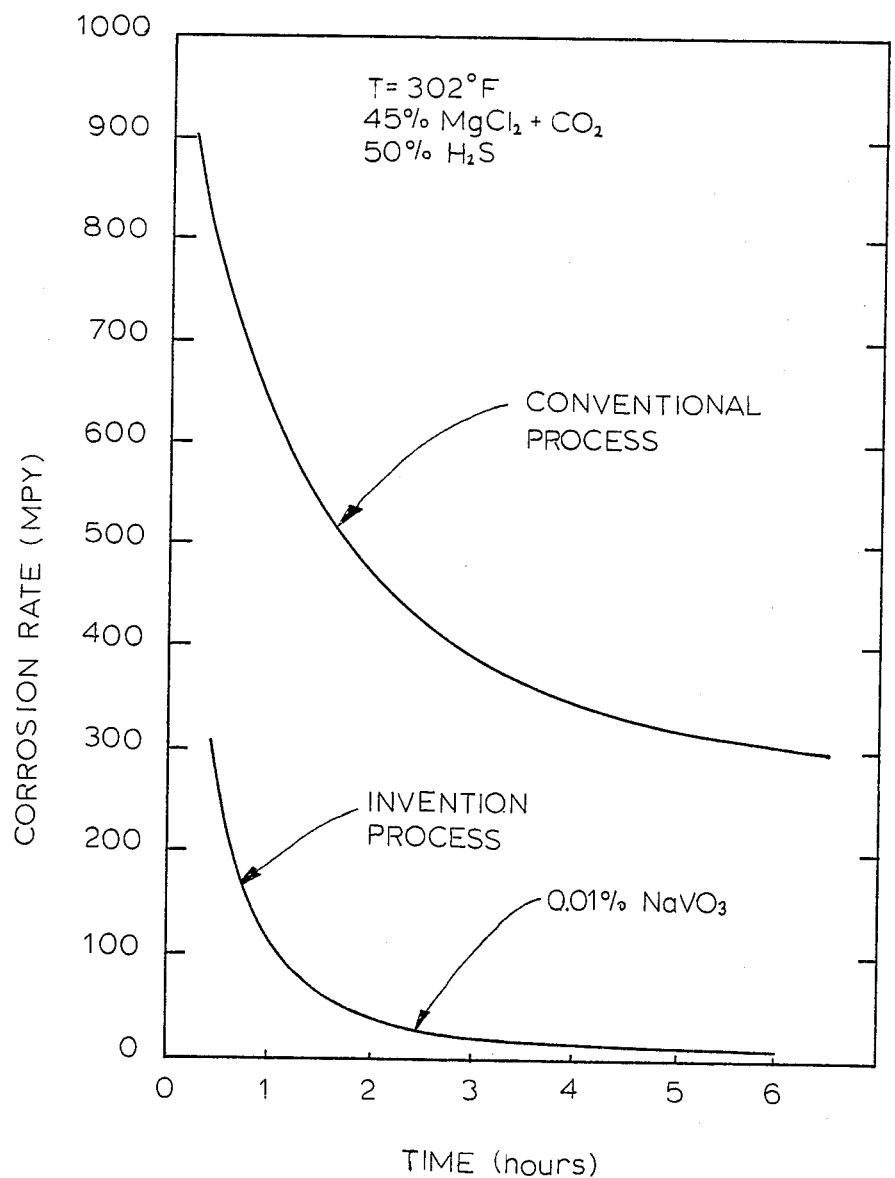
FIG. 1 is a curve showing the effect of the use of a metavanadate in accordance with the method of the invention on the corrosion rate of carbon steel.

Reference will now be made in detail to presently preferred embodiments of the invention, examples of which are described below and illustrated in the accompanying drawings. In the examples and throughout the specification and claims, all parts and percentages are by weight unless otherwise specified.

EXAMPLE 1

Type 4130 carbon steel was exposed to a corrosive medium comprising a 45% aqueous solution of magnesium chloride saturated with a carbon dioxide-50% hydrogen sulfide gas mixture at a temperature of 302° F., and the rate of corrosion was determined electrochemically as a function of time. The results are shown in FIG. 1 wherein it is seen that the corrosion rate gradually decreased from a value of approximately 900 mils per year (MPY) to a value of about 300 MPY in about 6 hours. The gradual decrease in corrosion rate was due to the thickening of a rapidly growing ferrous sulfide scale which provided increasing resistance to corrosion as the diffusion distance of the ferrous ion was increased. After about 5 or 6 hours, the corrosion rate stabilizes at a value of about 300 MPY.

The experiment was repeated in the same corrosive medium which further contained 0.01% sodium metavanadate in solution in the corrosive medium. As seen in FIG. 1, the rate of corrosion was immediately reduced to 300 MPY and within 5 to 6 hours stabilized at less than 5 MPY.

EXAMPLE 2

In this example the initial corrosion rate was determined in a 1% sodium chloride aqueous solution saturated with various carbon dioxide/hydrogen sulfide gas mixtures at a temperature of 203° F. The results are shown in FIG. 2 and it is seen that by the addition of 0.005% of sodium metavanadate the initial rate of corrosion was significantly reduced. At each of the gas ratios or gas mixtures tested, the rate of corrosion dropped below 5 MPY in about 25 hours.

EXAMPLE 3

The experiment of Example 2 was repeated using pyrovanadate and orthovanadate as substitutes for metavanadate. The rate of corrosion in both instances was determined to drop below 5 MPY in about 25 hours.

In the absence of the metal salt addition, it is seen from the above examples that rapid corrosion occurs by transport of the ferrous ions through the rapidly formed ferrous sulfide scale. In contrast with the practice of the invention, the incorporation of the refractory metal atom into the iron sulfide lattice inhibits ferrous ion transport and thus limits corrosion to acceptable levels.

What is claimed is:

1. A method for inhibiting corrosion of an iron-containing alloy article in a sulfur compound-containing corrosive medium, said method comprising forming on said article a corrosion resistant sulfide layer containing atoms of a refractory metal of Group IV B or Group V B of the periodic system by introducing into said corrosive medium an amount sufficient to form said layer of an oxysalt of said refractory metal.

2. The method of claim 1 wherein said iron-containing alloy is steel.

3. The method of claim 2 wherein said steel is carbon steel.

4. The method of claim 1 wherein said oxysalt is selected from the group consisting of metavanadate, orthovanadate and pyrovanadate.

5. The method of claim 1 wherein said oxysalt is metavanadate.

6. The method of claim 1 wherein said oxysalt is orthovanadate.

7. The method of claim 1 wherein said oxysalt is pyrovanadate.

8. The method of claim 5 or claim 6 or claim 7 wherein said iron-containing alloy is steel.

9. The method of claim 5 or claim 6 or claim 7 wherein said steel is carbon steel.

10. A method for inhibiting corrosion of an iron-containing tubular article situated in a well and through which gas or oil is extracted from the well and said tubular article having an interior portion in contact with a sulfur compound-containing corrosive medium containing hydrogen sulfide, said method comprising forming on said article a corrosion resistant sulfide layer containing atoms of a refractory metal of Group IV B or Group V B of the periodic system by introducing into said corrosive medium an amount sufficient to form said layers of an oxysalt of said refractory metal.

11. The method of claim 10 wherein said iron-containing alloy is steel.

12. The method of claim 10 wherein said oxysalt is selected from the group consisting of metavanadate, orthovanadate and pyrovanadate.

13. The method of claim 10 wherein said oxysalt is metavanadate.

14. The method of claim 10 wherein said oxysalt is orthovanadate.

15. The method of claim 10 wherein said oxysalt is pyrovanadate.

* * * * *